United States Patent Office 2,986,053
Patented May 30, 1961

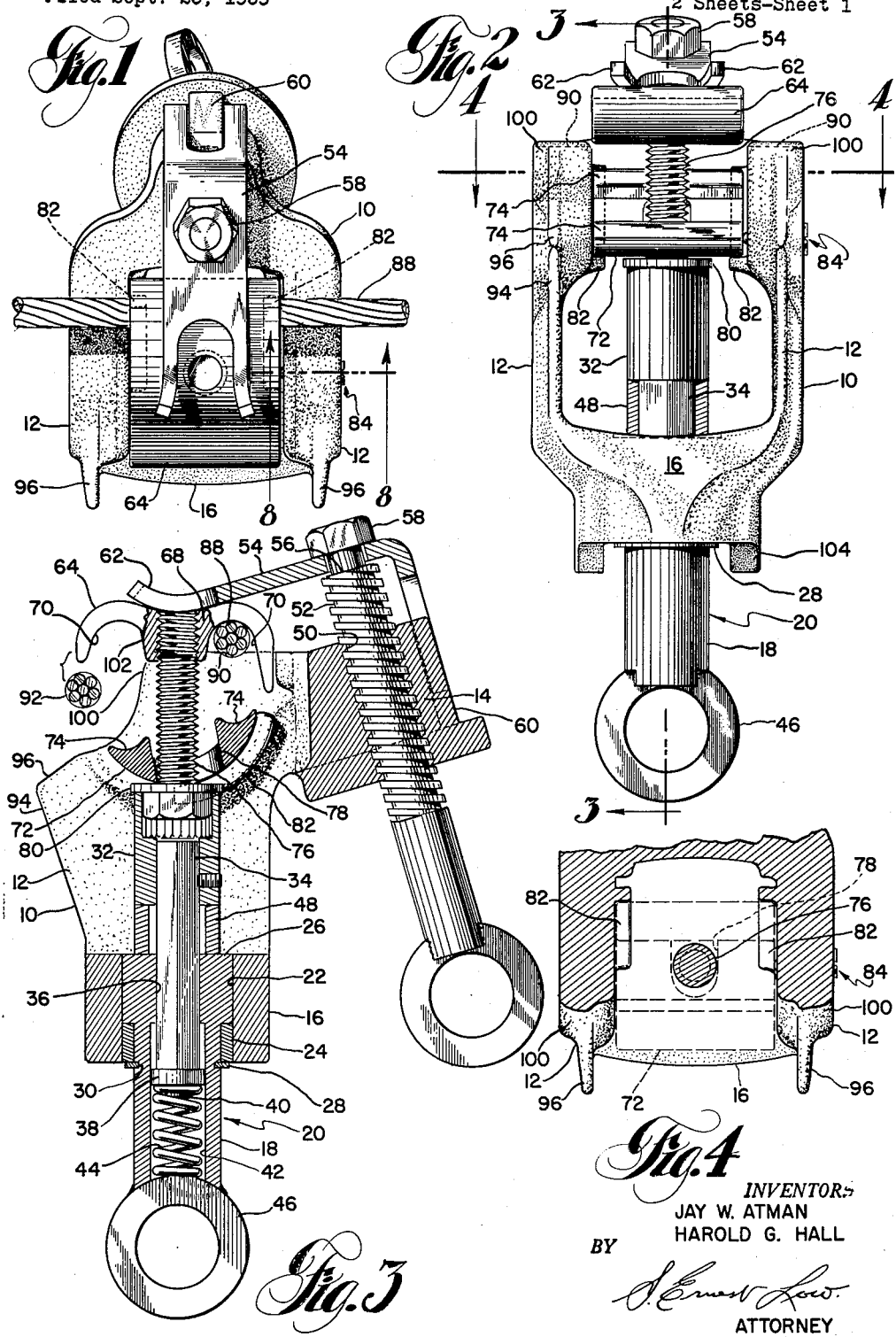

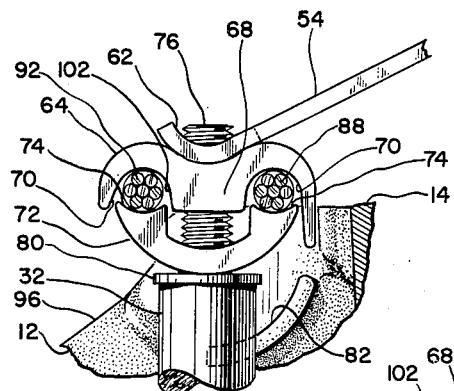
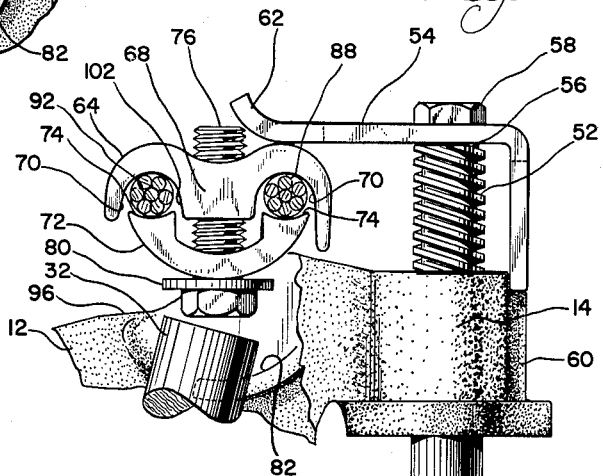
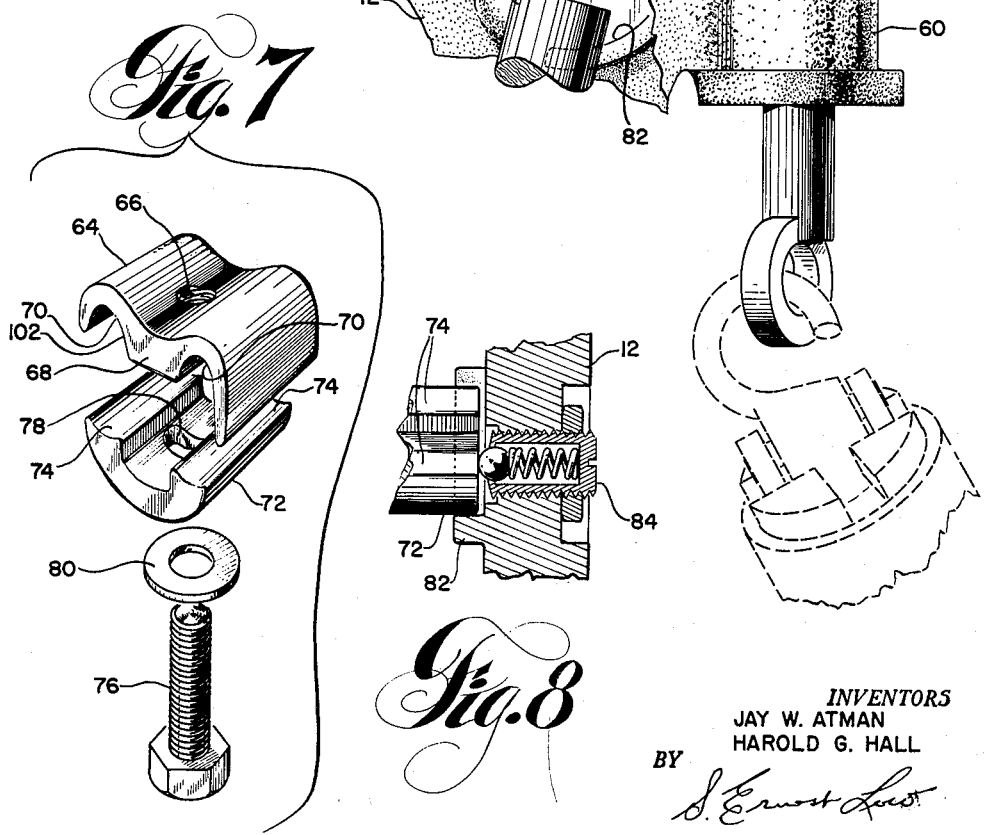
INVENTORS
JAY W. ATMAN
HAROLD G. HALL
ATTORNEY

2,986,053

HAND TOOL FOR APPLYING AND REMOVING LINE CONNECTOR CLAMPS

Jay W. Atman, Canonsburg, and Harold G. Hall, Pittsburgh, Pa.; said Atman assignor to Aluminum Company of America, Pittsburgh, Pa., a company of Pennsylvania Filed Sept. 23, 1959, Ser. No. 841,781

8 Claims. (Cl. 81—53)

This invention relates in general to tools or manipulators for attaching and removing connector clamps in their association with strung wires, rods, cables and similar installed structures. It is more specifically addressed to a vice-type manipulator for use in applying and removing parallel groove connector clamps, and a tap line associated therewith, with respect to elevated electrical conductors, without interrupting the power in the conductors. Although the manipulators of the invention have been successfully employed with regularity in hot line installations, it is to be understood that they can be employed with equally satisfactory results in applying and removing clamps from wires and cables in their de-energized condition, as well as with wire cables, rods and similar members which are never intended to be energized, such as in the application of a guy line on an existing strung cable or steel rod installation.

It is an object of the invention to provide a manually operated vice-type manipulator capable of use in installing and/or removing a tap line or guy wire in clamped relationship in respect to a structure comprising an existing rod, wire or cable element.

It is another object of the invention to provide a gripper device for receiving a parallel groove, center bolt clamp and a tap line or a guy wire, in fixed relationship in respect thereto, and permit transposition of the same from one location to a new location, wherein the clamp and tap line or guy wire are securely attached to an existing wire, cable or rod structure.

Another object of the invention is to provide a unitary manipulator applicable to parallel groove, center bolt connectors for use in hot line installation of tap lines.

Other objects and advantages of the invention will be understood from the following description of a manipulator selected for purposes of illustrating a preferred embodiment of the invention, reference being made to the accompanying drawings, in which:

Fig. 1 represents a top plan view of the preferred manipulator of the invention;

Fig. 2 represents a front elevational view of the manipulator of Fig. 1;

Fig. 3 represents a medial sectional elevation taken on the plane 3—3 of Fig. 2 illustrating the manipulator adjacent a suspended cable;

Fig. 4 represents a fragmentary sectional elevation taken on the plane 4—4 of Fig. 2;

Fig. 5 represents a fragmentary view similar to Fig. 3 of the upper portion of the manipulator at the completion of a cable-installing operation;

Fig. 6 represents a view similar to Fig. 5 illustrating the manipulator at a location during its removal following the installation operation illustrated in Fig. 5;

Fig. 7 represents a perspective view of a connector clamp with which the manipulator can be satisfactorily employed; and Fig. 8 represents a fragmentary sectional elevational view taken on the plane 8—8 of Fig. 1.

In general terms the manipulator of the invention comprises a housing or body member of substantially U or channel-shape supporting a rotatable socket wrench cup member secured to actuating means for the same extending axially through the web of the channel-shaped housing into cooperative engaging relationship with the head of a bolt of a two-piece connector clamp supported between the flanges of the aforesaid housing. An adjustably manipulatable gripper member or instrumentality is unitarily supported adjacent the open flanges of the channel-shaped housing of the manipulator and is actuatable to grip or clamp one half of the connector clamp and a guy or tap line wire employed therewith in the intended use of the mechanism or device of the invention.

More specifically, a manipulator falling within the scope of the invention incorporates a main housing 10 of generally channel or U-shape having parallel flanges 12 connected adjacent their upper extremities to provide an off-set boss 14 and connected across their lower extremities by a web 16.

The web 16 serves as a table or bench within the housing 10 for supporting a rotatable wrench assembly identifiable in its entirety by the reference numeral 20. The wrench assembly comprises a cylindrical tubular housing 18 rotatably disposed within a cylindrical bore 22 (Fig. 3) in the web 16, the bore being preferably provided with a press fit annular bearing or bushing 24 and otherwise occupied by an enlarged cylindrical terminus head portion 26 of the tubular housing 18. A replaceable retainer ring 28 within an annular groove 30 on the external surface of the housing 18 is a preferred means of rotatably securing the housing 18 within the web 16.

The wrench assembly 20 further includes a central bolt-engaging device or socket wrench cup 32 replaceably secured at one end of a polygonal shaft 34, the shaft being preferably square in cross-section and extending through a complementary bore 36 located axially through the enlarged head 26 of the tubular housing 18, where it is provided with an enlarged cylindrical collar or abutment 38 and an extending smaller diameter cylindrical pilot extension 40. It will be observed that the collar 38 has a sliding fit within an axially uniform cylindrical bore 42 in the tubular housing 18 and that a coiled spring 44 is received within the space formed between the pilot extension 40 and interior bore 42. A circular eye in the form of an annulus 46 secured as by welding to the exposed terminus of the housing 18 provides means for rotating the socket 32 of the wrench assembly, as well as retaining the spring 44 within the bore 42 in the tubular housing 18.

In respect to the above-described wrench assembly 20, is will be observed that a spacer collar 48, loosely surrounding the shaft 34 and disposed between the under side of socket 32 and the upper surface of the enlarged head 26 of the tubular housing 18, may be employed to limit axial downward movement of the socket 32, as will be appreciated from inspection of Fig. 3. Axial upward movement of the socket 32, in the opposite direction, occurs as a result of rotation of the socket cup 32, as will be hereinafter described, aided by resilient biasing extension of the coiled spring 44.

The aforementioned off-set boss 14 is provided with a threaded aperture 50 extending axially through its depth in a direction angularly disposed towards the axis of the wrench assembly 20. An eye bolt 52, preferably provided with a double lead left hand thread, engages within the threaded aperture 50 and supports a clevis member 54 at its threaded extremity. The eye bolt 52 is preferably reduced to provide a shoulder 56 against which the clevis 54 is supported, and a captive or riveted nut 58 on the reduced end of the bolt serves to retain the clevis 54 axially fixed in respect to the bolt 52, but otherwise movable relatively thereto.

The clevis member 54 is generally angular in shape with a downwardly extending leg thereof bifurcated for rectilinear guided movement, under the influence of rotational movement of the eye bolt 52, by a rib or key 60 projecting outwardly from the boss 14. The remaining leg of the clevis member 54 is also bifurcated and arcuately curved, as at 62, over a portion of its length.

The manipulator tool thus far described is particularly adapted to be employed in installing and removing connector clamps, popularly referred to as parallel groove, single center bolt connectors, a typical example of which is illustrated in Fig. 7. The connector clamp in question comprises a parallel grooved member 64 having a threaded aperture 66 through a longitudinal central boss 68 separating the parallel cable, wire or rod receiving grooves 70 therein. A companion pusher member 72, having cable-pushing or engaging surfaces 74 capable of alignment with the parallel grooves in the element 64, is assembled on a center bolt 76 in threaded engagement within the threaded aperture 66. A clearance aperture, such as the elongated or elliptical opening 78 through pusher member 72, permits relative angular disposition of the connector clamp elements 64 and 72 to accommodate various sizes of cables, wires or rods within the clamp, and a washer 80 is recommended under the head of the center bolt 76 in the application of the connector clamp.

To effect installation of a connector clamp of the general type illustrated in Fig. 7, together with an associated tap line or guy wire, on an already installed or existing elevated or strung cable, or its equivalent wire or rod structure, the elements 64 and 72 of the connector clamp are disposed between the upstanding legs of flanges 12 of the manipulator with the bolt 76 fully extended and its head within the socket cup 32. A spring loaded ball 84 (Fig. 8) in one of the upstanding flanges 12 of the housing 10 exerts a resilient or impositive holding force against the end surface of the connector clamp element 72 adjacent thereto, while forcing the opposite end of the element against the interior surface of the opposite flange 12 of the manipulator housing 10. If desired the spring loaded ball 84 may be provided on both flanges 12 of the housing 10, in which case the element 72 would be resiliently restrained between the oppositely disposed pair of spring loaded balls 84.

The element 64 of the connector clamp, preferably connected to its mating member 72 by at least one or two full threads of the center bolt 76 in engagement within the threaded aperture 66, engages the tap line or guy wire 88 in one of its parallel grooves 70, the line being otherwise supported in aligned grooves or seats 90 in the upper surfaces of the flanges 12 of the housing 10, left hand threaded bolt 52 being rotated to lower the clevis 54 and engage its arcuate bifurcated leg portions 62 on the exposed curved surface of connector clamp element 64 underlying the same on both sides of the bolt 76. Engagement of the angularly disposed leg of the clevis member 54 on the exposed upper surface of the connector clamp member 64 serves to securely clamp the tap line or guy wire 88 to the manipulator housing 10, while providing a clear or unobstructed throat entrance between the second or unoccupied parallel groove 70 in the member 64 (Fig. 3) and its underlying impositively held associated clamp member 72 of the clamp connector for translation of the unitary assembly of the manipulator tool, connector clamp and tap or guy line into position to receive and register with an installed or existing elevated cable, or the like, 92.

It is to be observed that the clamp element 72, restrained by at least one spring loaded ball 84, is preferably tilted forwardly (Fig. 3), and that its rear edge engages a pair of spaced lugs 82, which serve as guides to insure proper alignment of the lower element 72 with its cooperating clamp element 64 on advance of element 72 towards element 64 under the rotational influence of center bolt 76. As a further aid in placing the unitary assembly of connector clamp, tap line or guy wire, and manipulator in registry with the installed cable 92, the flanges 12 of the housing 10 are preferably angularly disposed, as at 94 and 96, to provide inclined guiding surfaces for the cable 92 towards the gap between the elements 64 and 72 of the connector clamp, the shoulders 100 (Fig. 3) on the flanges 12, in cooperation with the wall 102 of the central boss 68 of element 64, serving as stop surfaces against which the cable 92 abuts and should be so maintained while the wrench assembly 20 is rotatably turned to advance the center bolt 76 and thereby carry the clamp element 72 into clamping relationship of its pusher surfaces 74 against the cables 88 and 92 to force the same into the opposed grooves 70 of the otherwise stationary clamp member 64.

Following attachment of the clamp elements 64 and 72, through their engagement with the wires, rods or cables 88 and 92, as above described, rotation of the left hand threaded bolt 52 to raise the clevis 54 out of clamping contact with the outer surface of connector clamp member 64 permits tilting withdrawal of the manipulator out of engagement or contact with the line 92, as illustrated in Fig. 6. The upwardly biasing extension of the spring 44, and resilient compression thereof, permits disengagement of the socket cup 32 from the head of bolt 76, in removing the manipulator from the installed cable or rod 92.

It will be observed that the manipulator of the invention lends itself to applying hot line clamp connectors to energized power lines, in which case an operator engaged in such a pursuit would normally be some distance from the energized cable. The same condition of use of the manipulator can exist, however, in applying clamp connectors on de-energized power cables, or, in fact, applying a guy wire or drop line to an antenna or similar structure which may never be energized by electric power. Under any of the foregoing circumstances, a conventional hot stick, elements of which are illustrated and described in United States Letters Patents 2,288,776, issued July 7, 1942, and 2,194,411, issued March 19, 1940, have been successfully employed to manipulate the eye bolt 46 and associated wrench assembly 20, as well as the eye bolt 52, the impositive or resilient retention of the clamp connector element 72, through frictional restraint by one or a pair of the spring loaded balls 84, separated from its complementary element 64 within the housing 10 of the manipulator, permitting approaching an installed line member 92, or its equivalent, from any angle within a 360° orbit thereof. The lugs 104 adjacent the web 16 of the manipulator housing 10 are provided for engagement within complementary slots provided in the terminal sleeve members of conventional hot sticks, referred to above, and provide unitary connection between the manipulator of the invention and its actuating hot stick.

It will be understood that removal of the installed connector clamp elements 64 and 72, and the line 88, from an installed cable, rod, or wire 92 is accomplished by reverse manipulation of the center bolt 76. In such a case the hot stick would be engaged with the eye 46 and the bolt 76 rotated to release the clamp connector element 72 and permit tilting withdrawal of the housing 10 and line 88 clamped thereto by the upper clamp element 64.

Details of the construction of the manipulator described hereinabove may be varied substantially. It is therefore intended that all descriptive matter contained in the foregoing specification and shown in the accompanying illustrations are to be interpreted as illustrative only and not in a limiting sense.

What is claimed is:

1. A manipulator for installing and removing a connector clamp and a line associated therewith in respect of an installed rod-like structure, said manipulator comprising a housing of substantially channel form adapted to receive and impositively retain one element of a parallel groove connector clamp with a head of a connecting bolt passing freely through the same received within a wrench element supported by the housing, the connecting bolt being otherwise threadingly aligned with a second separated element of the connector clamp with one parallel groove thereof engaging the line otherwise supported on flanges of the housing, a translatable bolt in threaded engagement with a boss carried by the housing, a clamping clevis rectilinearly movable with the translatable bolt into and out of bearing contact on an external surface of the second-mentioned connector clamp element, and a rotatable wrench actuating assembly carried by the housing for rotating the wrench element to translate the connecting bolt and the first-mentioned connector clamp element out of impositive separated retention in the housing into engaging relationship of the same against an installed rod-like structure and the line to effect clamping relationship of both elements of the connector clamp on the rod-like structure and line within parallel grooves of the connector clamp.

2. A manipulator for installing and removing a connector clamp and a line associated therewith in respect of an installed elevated cable, said manipulator comprising a housing of substantially U-form adapted to receive and impositively retain one element of a parallel groove connector clamp between the flanges of the U-housing with a head of a connecting bolt, the shank of which passes freely through the same, receivable within a wrench element supported by the U-housing, the connecting bolt being otherwise threadingly aligned with a second element of the connector clamp spaced from the first-mentioned connector clamp element with one parallel groove thereof engaging the line otherwise supported on the opposed flanges of the U-housing, a translatable bolt in threaded engagement with the U-housing, a clamping element carried by and rectilinearly movable with the translatable threaded bolt into and out of bearing contact with an exposed surface of the second-mentioned connector clamp element, and a resiliently biased actuating means carried by the U-housing and actuatable to rotate the wrench element and translate the connecting bolt received therein and the first-mentioned connector clamp element out of impositive retention between the flanges of the U-housing into engaging relationship of the same against the installed elevated cable and the line to effect positive clamping relationship of both elements of the connector clamp on the installed elevated cable and the line within parallel grooves of the connector clamp.

3. A manipulator for installing and removing a two-element, parallel groove, single bolt connector clamp and a line associated therewith in respect of an installed rod-like member, said manipulator comprising a channel-shaped housing having a rotatably operated spring-biased wrench assembly securably mounted within the web of the housing and extending upwardly therethrough to present a rotatable wrench element between the flanges of the housing, a boss integral with the flanges of the housing above the web thereof, a translatable bolt member threadingly engaged within the boss, a clevis member carried by the translatable bolt and movable therewith, said clevis member having angularly disposed portions one of which overlies the housing between the flanges thereof and the other portion engaging the boss to prevent other than unitary rectilinear movement of the clevis and translatable bolt relative to the housing, a spring loaded ball within at least one flange of the housing presenting an impositive stop facing inwardly towards the opposite flange of the housing, and a pair of aligned line-receiving grooves in upper surfaces of the flanges of the housing inboard of the integral boss and outboard of the axis of the wrench assembly, said manipulator being adapted to receive the head of the single bolt of the two-element connector clamp within the rotatable wrench element in threaded connection with one of the two elements of the connector clamp engaged by the overlying portion of the clevis, while the stated connector clamp element receives and securely embraces a line supported in the aligned grooves in the flanges of the housing within one of the parallel grooves in the stated connector clamp element and the second element of the connector clamp is loosely supported on the head of the single bolt and impositively held by the spring loaded ball in spaced relationship to the first-mentioned connector clamp element, rotation of the single bolt effecting axial translation of the same and the connector clamp element loosely carried thereby into positive clamped relationship of the two-element clamp on the line and on an installed rod-like member offered between the elements of the connector clamp.

4. A manipulator for installing a tap line on an elevated energized conductor, said manipulator comprising a U-housing adapted to receive and support two elements of a connector clamp, a connecting bolt therefor and a tap line, a rotatable wrench assembly secured within the web of the U-housing and extending vertically therethrough to present a socket for receiving the head of the connecting bolt of the connector clamp between the flanges of the U-housing, a translatable bolt member mounted within a boss formed integrally with the flanges of the U-housing above the web thereof, a clamping clevis member carried by the translatable bolt and rectilinearly movable therewith into and out of bearing contact on an exposed surface of one element of the connector clamp in threaded engagement with the connecting bolt and supported on a tap line disposed across the flanges of the U-housing, the second element of the connector clamp being loosely supported on the head of the connecting bolt, surrounding its shank and impositively held between the flanges of the U-housing below and in separated relationship to the first-mentioned connector clamp element, portions of the flanges of the U-housing being inclined towards the axis of the wrench assembly and terminating in stop surfaces below the plane of the flanges supporting the tap line, the inclined flange portions and stop surfaces constituting a guiding entrance throat for positive engagement of the first-mentioned connector clamp and manipulator U-housing with the surface of the elevated energized conductor, and rotation of the wrench assembly by a conventional hot stick and advancement of the connecting bolt and second-mentioned element of the connector clamp therewith serving to close the connector clamp elements on the elevated energized conductor and tap line in spaced parallel relationship of the conductor and tap line between the connector clamp elements.

5. A manipulator for installing and removing a parallel groove connector clamp and line wire in their association with an installed cable, said manipulator comprising a channel-shaped housing having a web and flanges normal thereto, said flanges supporting a boss adjacent their ends remote from said web and offset laterally to a medial axis through and normal to the web, a rotatable wrench assembly supported by the web in the medial axis and carrying a rotatable bolt head socket at one of its extremities between the flanges and an aligned operating eye at its opposite extremity exterior to said web, a gripper actuating threaded member in threaded engagement within a threaded aperture in said boss, the axis of said gripper actuating threaded member being inclined angularly in respect of the axis of the rotatable socket and forming an acute angle therewith at a point remote from the web and inwardly from the boss, a gripper element supported on the gripper actuating threaded member having a leg thereof extending inwardly over the rotatable socket and a second angularly disposed leg in guided engagement with the boss, said gripper element being linearly translatable on rotation of the gripper actuating threaded member, and aligned line-receiving depressions in the flanges adjacent the boss and within the acute angle formed between the axes of the rotatable socket and gripper actuating threaded member.

6. A manipulator for installing a two-element, parallel groove, bolt-connectable connector clamp and a line associated therewith on an installed rod-like member, said manipulator comprising a channel-shaped housing having a rotatably operated resiliently-biased wrench assembly carried thereby and extending through the web of the housing to present a rotatable wrench element between the flanges thereof, a laterally disposed boss carried by the housing, an axially translatable bolt member in threaded engagement in a bore through said boss, a clevis member carried by the translatable bolt member and axially movable therewith, said clevis member having unitary angularly disposed portions one of which overlies the housing above and between the flanges thereof and the other portion engaging the boss to prevent other than unitary rectilinear movement of the clevis and translatable bolt members relative to the housing, means carried by at least one flange of the housing presenting an impositive resilient stop facing inwardly towards the opposite flange thereof, and a pair of line-receiving grooves in upper surfaces of the housing flanges inboard the laterally disposed boss and outboard the axis of the wrench assembly, said manipulator being adapted to receive the head of a connecting bolt of the two-element connector clamp within the rotatable wrench element in threaded connection with one of the two elements of the connector clamp engaged by the overlying portion of the clevis member, while the stated connector clamp element receives and securely embraces a line supported in the aligned grooves in the upper surfaces of the housing flanges within one of the parallel grooves in the stated connector clamp element and the second element of the connector clamp is loosely supported on the head of the connecting bolt and held impositively by the resilient stop means in spaced relationship to the first-mentioned connector clamp element, rotation of the connecting bolt effecting axial translation of the same and the connector clamp element carried by the head of the connecting bolt into positive clamped relationship of both elements of the connector clamp on the line and on an installed rod-like member offered and received within the other parallel groove in the elements of the connector clamp.

7. A connector clamp manipulator for installing and removing a bolt-connectable, two-element, parallel groove connector clamp and a line associated therewith on an installed rod-like member, said manipulator comprising a substantially U-shaped housing adapted to receive and impositively retain one element of the clamp with the head of a connecting bolt therefor passing freely through the same received within a wrench element carried by and disposed between the flanges of the housing, the connecting bolt being otherwise threadingly aligned with a second separated element of the clamp with one parallel groove thereof engaging a line otherwise supported on the flanges on the housing, an axially translatable bolt in threaded engagement with a boss carried by the housing and laterally offset in respect to the wrench element, a clamping clevis rectilinearly movable with the axially translatable bolt into and out of bearing contact on an external surface of the second-mentioned element of the clamp, and a rotatable wrench actuating assembly carried by the housing for rotating the wrench element to translate the connecting bolt and first-mentioned connector clamp element out of impositive separated retention in the housing into engaging relationship of the same against an installed rod-like member and the line to effect clamping relationship of both elements of the clamp on the rod-like member and the line within the parallel grooves thereof.

8. A parallel groove two-element clamp manipulator comprising a U-shaped housing having a web and unitary upstanding spaced flanges, a boss immovably carried by the housing remote from the web and laterally disposed in respect to the upper surfaces of the flanges of the housing, a pair of aligned grooves in the upper surfaces of the flanges inboard of said boss, said housing having a rotatable wrench element carried by and extending through the web between the flanges thereof, means within the housing adapted to impositively retain one element of the parallel groove connector clamp with a connecting bolt extending loosely therethrough with its head received within the wrench member, a translatable gripper means guidingly supported by the boss in overhanging relationship in respect to and between the upper surfaces of the flanges of the housing, said gripper means being adapted to engage an outer surface of the second element of the parallel groove connector clamp disposed in threaded alignment with the connecting bolt and having one of its parallel grooves in clamping engagement with a tap line supported within the aligned pair of grooves in the upper surfaces of the flanges of the housing, and means exterior to the housing web for detachable connection to the rotatable wrench element to rotate the same to advance the connecting bolt into threaded engagement with the second-mentioned element of the connector clamp and advance the first-mentioned element thereof into clamping engagement of the line and an installed rod-like member each within one of the parallel grooves formed within both elements of the connector clamp.

References Cited in the file of this patent

UNITED STATES PATENTS

| | | |
|---|---|---|
| 2,016,749 | Mack | Oct. 8, 1935 |
| 2,090,134 | Lawson | Aug. 17, 1937 |
| 2,114,736 | DeRight et al. | Apr. 19, 1938 |
| 2,194,411 | Lipsord | Mar. 19, 1940 |
| 2,605,661 | Heuer et al. | Aug. 5, 1952 |
| 2,633,043 | Becker et al. | Mar. 31, 1953 |
| 2,742,806 | Pavelka | Apr. 24, 1956 |
| 2,768,548 | Spears | Oct. 30, 1956 |